US011477319B2

United States Patent
Poulain et al.

(10) Patent No.: US 11,477,319 B2
(45) Date of Patent: Oct. 18, 2022

(54) APPARATUS AND METHOD FOR PREVENTING USE OF A MOBILE DEVICE WHILE OPERATING A VEHICLE

(71) Applicant: Drivecare Technologies Inc., Halifax (CA)

(72) Inventors: Angus Poulain, Halifax (CA); Josh Poulain, Halifax (CA)

(73) Assignee: Drivecare Technologies Inc., Halifax (CA)

( * ) Notice: Subject to any disclaimer, the term of this patent is extended or adjusted under 35 U.S.C. 154(b) by 167 days.

(21) Appl. No.: 16/465,844

(22) PCT Filed: Sep. 8, 2017

(86) PCT No.: PCT/CA2017/051057
§ 371 (c)(1),
(2) Date: May 31, 2019

(87) PCT Pub. No.: WO2018/045468
PCT Pub. Date: Mar. 15, 2018

(65) Prior Publication Data
US 2021/0385322 A1    Dec. 9, 2021

(30) Foreign Application Priority Data

Sep. 8, 2016  (CA) ................. CA 2941368

(51) Int. Cl.
*H04W 4/48* (2018.01)
*H04M 1/72463* (2021.01)
(Continued)

(52) U.S. Cl.
CPC ....... *H04M 1/72463* (2021.01); *H04W 4/021* (2013.01); *H04W 4/48* (2018.02); *H04W 4/027* (2013.01)

(58) Field of Classification Search
CPC ......... H04W 4/027; H04W 4/70; H04W 4/80; H04W 12/30; H04W 48/00; H04W 48/02;
(Continued)

(56) References Cited

U.S. PATENT DOCUMENTS 7,123,874 B1    10/2006  Brennan
8,706,143 B1    4/2014   Elias
(Continued)

FOREIGN PATENT DOCUMENTS

WO    2015198306 A1    12/2015

OTHER PUBLICATIONS

International Preliminary Report on Patentability for PCT/CA2017/051057, filed Sep. 8, 2017, dated Mar. 12, 2019, pp. 1-7.
(Continued)

*Primary Examiner* — Jean A Gelin
(74) *Attorney, Agent, or Firm* — George McGuire

(57) ABSTRACT

An apparatus for preventing use of a mobile device while operating a motor vehicle includes a housing for connection to the motor vehicle, a processor and memory contained within the housing for storing and executing mobile device locking software and communication circuits contained within the housing and connected to the processor for sending and receiving locking signals to the mobile device. When the vehicle power is turned on the locking signals are sent to the mobile device and a locking application installed on the mobile device locks the mobile device and prevents the sending or receiving of calls or text messages.

21 Claims, 1 Drawing Sheet

(51) Int. Cl.
*H04W 4/021* (2018.01)
*H04W 4/02* (2018.01)

(58) Field of Classification Search
CPC ..... H04W 48/04; H04W 48/08; H04W 4/021; H04W 4/48; H04K 2203/22; H04K 3/415; H04M 1/6075; H04M 1/72463; H04M 2250/10
See application file for complete search history.

(56) References Cited

U.S. PATENT DOCUMENTS

| | | | | |
|---|---|---|---|---|
| 9,796,391 | B2* | 10/2017 | Olson | B60K 35/00 |
| 10,515,543 | B2* | 12/2019 | Madigan | B60W 50/14 |
| 2007/0043893 | A1* | 2/2007 | Ishii | G06F 13/4072 |
| | | | | 710/302 |
| 2007/0120948 | A1* | 5/2007 | Fujioka | H04M 1/66 |
| | | | | 348/14.01 |
| 2012/0006611 | A1* | 1/2012 | Wallace | H04M 1/67 |
| | | | | 180/272 |
| 2012/0244849 | A1 | 9/2012 | Thomson | |
| 2013/0072174 | A1 | 3/2013 | Enty et al. | |
| 2014/0184394 | A1* | 7/2014 | Liu | G08C 17/02 |
| | | | | 340/12.22 |
| 2015/0256999 | A1 | 9/2015 | Doorandish | |
| 2017/0120948 | A1* | 5/2017 | Kitazume | B62D 15/0235 |
| 2017/0134906 | A1* | 5/2017 | Yoo | H04W 8/22 |
| 2019/0095075 | A1* | 3/2019 | Yang | G06T 3/40 |

OTHER PUBLICATIONS

International Search Report and Written Opinion Form PCT/ISA/210 and PCT/ISA237, pp. 1-9 , International Filing Date Sep. 8, 2017, dated Dec. 18, 2017.
EPO Office Action, dated Jul. 1, 2021. pp. 1-5.
Supplementary European Search Report, dated Apr. 14, 2020.
Canadian Office Action, dated Jun. 29, 2021. Citing Reference US 2013/0072174 A1—previously cited on IDS filed May 31, 2019.

* cited by examiner

APPARATUS AND METHOD FOR PREVENTING USE OF A MOBILE DEVICE WHILE OPERATING A VEHICLE

CROSS REFERENCE TO RELATED APPLICATIONS

The present is the U.S. National Phase Applications of PCT Application No. PCT/CA2017/051057, filed Sep. 8, 2017, which in turn relates and claims priority to Canadian patent application No. 2,941,368, filed on Sep. 8, 2016, the entire content of each of which is incorporated herein by reference.

FIELD

The invention relates to preventing mobile device use, more particularly to an apparatus and method for preventing use of a mobile device in a motor vehicle.

BACKGROUND

Using cell phones or other mobile devices while operating motor vehicles has become a dangerous and often deadly habit for many drivers. Attempts have been made to stop cell phone use while driving by using applications installed on the phone. This requires driver discipline, since it is often possible for the driver to simply change the function and permissions on the application, which would allow use of the cell phone while driving. Other applications may allow the driver to simply put the application in passenger mode, and then reach over to the passenger side of the vehicle to use the phone. Another device relies on solar power and is attached to the windshield by sticky strips. In this case, the driver can simply remove the device from the windshield, place it in the trunk or glove box, and then use the cell phone while driving.

Consequently, a new solution is required that addresses the deficiencies of the existing systems to prevent mobile device use while operating a motor vehicle.

SUMMARY

The applicant has developed a new apparatus and method as described herein for preventing use of a mobile device while operating a motor vehicle that addresses some of the shortcomings of the prior art and provides new advantages.

In one embodiment, the applicant's method is executed by software installed on a device that can be placed under the dash of any motor vehicle and hard wired to the vehicle ignition. It is out of sight, out of reach, and out of mind of the driver. The applicant's device does not allow the use of the driver's mobile device within the front area of a motor vehicle.

In another embodiment, the applicant's method is executed by a software application installed on the navigation system or computer of the motor vehicle.

Accordingly, then, in one aspect, there is provided an apparatus for preventing use of a mobile device while operating a motor vehicle comprising: a housing for connection to the motor vehicle; a processor and memory contained within the housing for storing and executing mobile device locking software; communication circuits contained within the housing and connected to the processor for sending and receiving locking signals to the mobile device when the vehicle power is turned on; and a mobile device locking application installed on the mobile device for locking the mobile device when the locking signals are received by the mobile device.

In another aspect, there is provided, an electronic locking device and a mobile device locking application for preventing use of the mobile device while operating a motor vehicle, the mobile device comprising a mobile device processor and a mobile device memory, the locking application comprising mobile device instructions to be stored on the mobile device memory for execution by the mobile device processor; the locking device comprising: a housing for attachment to the motor vehicle; a locking device processor and a locking device memory contained within the housing, the locking device memory for storing locking device instructions, and the locking device processor for executing the locking device instructions; and communication circuits connected to the locking device processor, the locking device instructions, when executed by the locking device processor configuring the locking device to send a lock signal to the mobile device when the vehicle power is turned on, the mobile device instructions, when executed by the mobile device processor configuring the mobile device to enter into a locked condition when the lock signals are received by the mobile device, thereby preventing use of the mobile device.

In a further aspect, there is provided a method for preventing use of a mobile device while operating a motor vehicle, the method comprising: installing a locking application on a memory of the mobile device, the locking application comprising mobile device locking instructions for execution by a processor of the mobile device upon receipt of a lock signal by the mobile device; connecting a locking device to the power supply of the motor vehicle; sending the lock signal from the locking device to the mobile device when the vehicle power is turned on, the lock signal causing the mobile device processor to execute the mobile device locking instructions configuring the mobile device to enter into a locked condition, thereby preventing use of the mobile device.

In yet another aspect, there is provided, a method for preventing use of a mobile device while operating a motor vehicle, the motor vehicle including a motor vehicle processor, a motor vehicle memory, and a means for communicating with the mobile device, the method comprising: installing a first locking application on a memory of the mobile device, the first locking application comprising first locking instructions for execution by a processor of the mobile device configuring the mobile device into a locked condition upon receipt of a lock signal; installing a second locking application on the memory of the motor vehicle, the second locking application comprising second locking instructions for execution by the motor vehicle processor configuring the motor vehicle to send the lock signal to the mobile device when the motor vehicle power is turned on; turning on the power of the motor vehicle, thereby causing the motor vehicle to send the lock signal to the mobile device.

BRIEF DESCRIPTION OF THE DRAWINGS

Referring to the drawings wherein like reference numerals indicate similar parts throughout the several views, several aspects of applicant's apparatus and method for preventing use of a mobile device while operating a motor vehicle are illustrated by way of example, and not by way of limitation, in detail in the figures, wherein.

DETAILED DESCRIPTION

Embodiments of the applicant's apparatus and method for preventing use of a mobile device while operating a motor vehicle will now be described in further detail.

Figure 1:
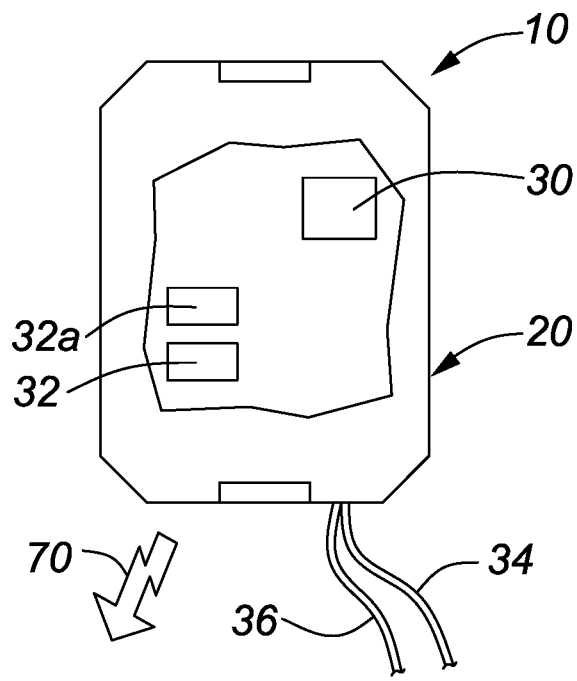
FIG. 1 is a schematic representation of the applicant's locking device for preventing use of a mobile device while operating a motor vehicle.

FIG. 1 shows the applicant's locking device 10 for preventing use of a mobile device while operating a motor vehicle. The locking device 10 includes a durable protective housing or case 20 (shown in FIG. 1 with the top partially cut away to show the interior of the case), enclosing integrated circuits 30, including a processor and memory for executing mobile device locking software, a Global Positioning System (GPS) or Global Navigation Satellite System (GNSS) receiver for determining a current location of the locking device 10 (optional), and a low energy Bluetooth™ communication chip 32. Also included is a second Bluetooth chip 32a having iBeacon™ functionality that will be described in further detail below. Other communication protocols could be used, such as Near Field Communication (NFC) or WiFi. The case 20, including the circuits 30 and the Bluetooth chips 32 and 32a may be installed under the dash of any motor vehicle. Two wires 34, 36 are attached to the case 20 to provide power to the locking device 10. One wire—the ground wire—is connected to the vehicle frame, while the other wire is connected to the ignition accessory line. Alternate means for powering the locking device 10 include connection to a USB port, an On-Board Diagnostics port, or any other suitable means of supplying power to locking device 10. Each locking device 10 has a unique identification serial number.

Figure 2:
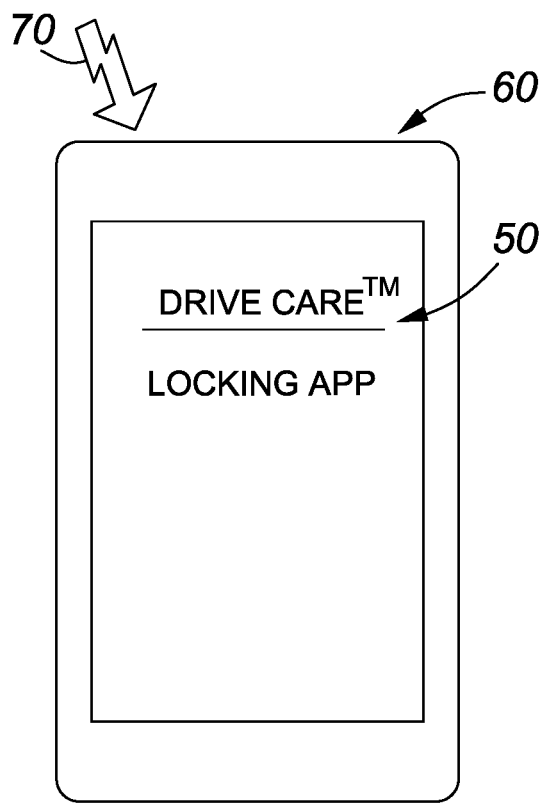
FIG. 2 is a representation of a mobile device and a locking application installed thereon.

As shown in FIG. 2, a mobile device locking application 50 is developed for installation on a user's cell phone 60 or other mobile device. The mobile device 60 may include a cellular radiofrequency (RF) transceiver for communicating with other devices. The cellular radiofrequency transceiver enables wireless communication with one or more base stations over a cellular wireless network using cellular communication protocols and standards for both voice calls and packet data transfer such as GSM, CDMA, GPRS, EDGE, UMTS, LTE, etc. For example, the mobile device 60 connects to a cellular network via a base transceiver station (BTS), base station controller (BSC), Serving GPRS Support Node (SGSN), and Gateway GPRS Support Node (GGSN). In an LTE implementation, the mobile device connects via eNode B (base station), mobility management entity (MME) and serving gateway (SGW).

The mobile device 60 may include a Subscriber Identity Module (SIM) card for GSM-type devices or a Re-Usable Identification Module (RUIM) card for CDMA-type devices. The RF transceiver may include separate voice and data channels.

The mobile device 60 may also include one or more ports for wired connections, e.g. USB, HDMI, FireWire (IEEE 1394), etc.

The mobile device 60 optionally includes a speech-recognition subsystem that has a microphone for transforming voice input in the form of sound waves into an electrical signal. Optionally, the mobile device 60 may include a speaker and/or an earphone jack.

The mobile device 60 includes a position-determining subsystem such as a Global Navigation Satellite System (GNSS) receiver, for example a Global Positioning System (GPS) receiver (e.g. in the form of a chip or chipset) for receiving GNSS (e.g. GPS) radio signals transmitted from one or more orbiting GNSS (e.g. GPS) satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

The mobile device 60 includes a Wi-Fi transceiver (which may, in some embodiments, be just a Wi-Fi receiver) for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification. Wi-Fi encompasses the IEEE 802.11 standard and all its drafts and amendments.

The mobile device 60 includes a Bluetooth transceiver, and/or a near-field communications (NFC) chip. The mobile device 60 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device 60 may include other sensors like a digital compass and/or accelerometer. Other sensors may include a tilt sensor, gyroscope or equivalent.

The mobile device 60 executes a mobile device locking application 50 using the processor of the mobile device. The memory of the mobile device stores the locking application 50. The mobile device locking application 50 may be developed for installation on any common cell phone or mobile device operating system, including Android™, iOS™ or Blackberry™. The locking application 50 includes functionality for communication between the mobile device 60 and locking device 10 via the Bluetooth communication protocol (or other communication protocol as mentioned above) and to receive locking signals 70 from locking device 10. Once the locking application 50 is installed on the mobile device 60, it may be hidden, making it difficult to erase or delete.

The mobile device locking software installed on locking device 10 includes functionality for communication between the locking device 10 and mobile device 60 and for sending locking signals 70 to the mobile device 60 and the locking application 50 installed on the mobile device 60.

In operation, once a driver carrying mobile device 60, having locking application 50 installed thereon, enters a motor vehicle in which locking device 10 has been installed and turns on the ignition, the locking device 10 powers up, automatically connects with the mobile device 60, and sends locking signals 70 to the mobile device 60. Subsequently, following receipt of locking signals 70 from the locking device 10, locking application 50 causes a lock screen to appear on the mobile device 60, putting the mobile device 60 into a "locked condition," preventing use of the mobile device 60, and muting the sound, until the vehicle ignition is turned off. The locking application 50 may allow the mobile device 60 to be used to make emergency 911 calls at any time as well as call up to four other safety numbers, which may be programmed by the owner. Once the vehicle ignition is turned off, locking device 10 powers down and severs its connection with mobile device 60. Once the locking application 50 determines that locking device 10 is no longer active, and determines through GPS measurement that mobile device 60 is moving at less than a predetermined minimum speed (for example, six kilometers per hour), locking application 50 returns mobile device 60 to an "unlocked condition", wherein all functions are available.

On mobile devices 60 running iOS, the first time locking device 10 tries to connect to the mobile device 60, the locking application 50 will prompt the user to tap a button that will initiate Bluetooth pairing. After the first use, pairing between locking device 10 and mobile device 60 is automatic, requiring no user intervention. If a different mobile device 60, running iOS and locking application 50 is detected, the Bluetooth pairing operation will need to be repeated for the first-time connection between locking device 10 and the different mobile device 60.

Other operating systems for mobile device 60, including Android™ and Blackberry,™ use non-pairing Bluetooth, which allows mobile device 60 to receive certain information from Bluetooth enabled devices, requiring no user intervention. For these operating systems, when the vehicle ignition is tuned on, locking device 10 powers up and broadcasts or advertises locking signals 70. In this case, locking signals 70 comprise the unique serial number of locking device 10, plus a system-specific prefix code, which is used to inform locking software 50 running on any mobile device 60 within range that locking device 10 has been connected. Following receipt of locking signals 70 from locking device 10, locking application 50 causes a lock screen to appear on the mobile device 60, putting the mobile device 60 into a "locked condition," preventing use of the mobile device 60, and muting the sound, until the vehicle ignition is turned off.

On mobile devices 60 running the iOS operating system the process required to place the mobile device 60 into a "locked condition" differs from that described above for other operating systems that use non-pairing Bluetooth. Once locking device 10 pairs with mobile device 60 running iOS, locking device 10 emulates the functionality of a Bluetooth peripheral keyboard to send locking signals 70 to mobile device 60 signaling locking application 50 to place mobile device 60 into a "locked condition". In this case, the locking signals 70 are sent using Bluetooth HID (Human Interface Device) commands.

If a user turns off Bluetooth on mobile device 60, the locking application 50 will automatically turn Bluetooth back on within 10 to 15 seconds. On mobile devices running iOS, the locking application 50 is unable to re-start Bluetooth. Instead, the locking application 50 will alert the user that Bluetooth has been turned off by displaying a notice on mobile device 60, and will also send a message to the vehicle owner advising that the user has turned off Bluetooth communication.

Once locking application 50 is installed and running on mobile device 60 no further action by the user is required. The user does not need to open the locking application 50 for it to function properly, and the only way to stop the locking application 50 is to uninstall it from the mobile device 60.

On mobile devices 60 running iOS, it is possible for the user to stop locking application 50 from running on mobile device 60. To manage this situation, the applicant has included functionality within locking device 10 to "wake up" locking application 50 to once again receive locking signals 70 from locking device 10. The iBeacon Bluetooth chip 32a is used to "wake up" locking application 50 from either a fully terminated state or a state where it is running in the background. If the user terminates locking application 50, a re-start signal is sent from locking application 50 to locking device 10, telling the iBeacon Bluetooth chip 32a to turn on and start sending a universally unique identifier ("UUID") to mobile device 60. The UUID signal is received by mobile device 60 and tells locking application 50 to restart.

In the event that the first UUID is not received, or locking application 50 fails to start after the first UUID is sent, a second unique UUID, may be sent after a predetermine UUID time interval. This process is repeated until the UUID is received by mobile device 60 and the locking application 50 is started. The number of unique UUIDs required will be determine by the length of the UUID time interval and the iOS UUID reset time. The UUID reset or cool down time is the time period that must pass before the iOS will be able to recognize a UUID that was previously sent. In the present case, the applicant has found that six unique UUIDs, combined with a UUID time interval of about eight seconds is sufficient for the iOS to reset and be able to again recognize the first unique UUID. Of course, one skilled in the art will appreciate that a different number of unique UUIDs may be used with a different UUID time interval.

Once the locking application 50 is awake and running, it will receive the locking signals 70 from locking device 10 and place mobile device 60 in the "locked condition". Locking application 50 then sends a brief signal to locking device 10 telling it to turn off the iBeacon chip 32a and stop sending the UUIDs.

Figure 3:
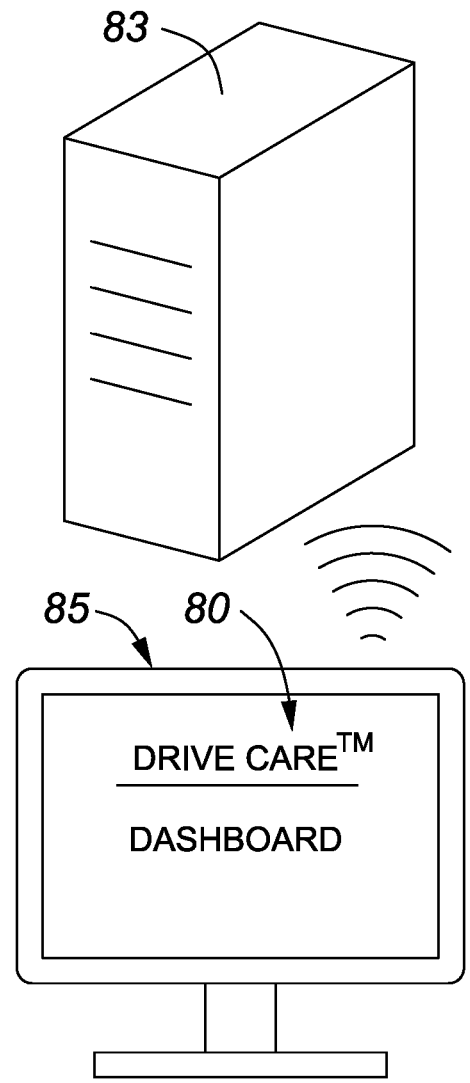
FIG. 3 is a representation of computer and a dashboard application being accessed thereon.

FIG. 3 shows a computer software application or dashboard 80 that may be installed on a server 83 and accessed through the Internet using any computer 85 or mobile device 60. The dashboard 80 communicates with locking application 50 and allows vehicle owners to login to their account on the server 83 and register the serial number of each locking device 10 they own.

When mobile device 60 running locking application 50 enters a vehicle having locking device 10 installed, locking application 50 measures the strength of the Bluetooth signal coming from locking device 10. The relative signal strength or RSSI of this Bluetooth signal is communicate to the dashboard 80 on server 83. If more than one mobile device 60 running locking application 50 enters the same vehicle, the dashboard 80 compares the RSSI numbers received from each mobile device 60. The mobile device having the highest RSSI is determined to be in possession of the driver and is allowed to remain locked. The server 83 sends the locking application 50 on the other mobile device(s) 60 an unlock signal, allowing the other mobile device(s) 60 to remain in the unlocked condition.

Locking application 50 includes functionality to collect and store a wide variety of data received from locking device 10, from mobile device 60, and/or from the vehicle itself through use of a vehicle commination link, such as SmartDeviceLink™ ("SDL"), which is being developed to standardize communication between motor vehicles and mobile devices. The collected data is sent from mobile device 60 to the server 83 at regular intervals over an available Internet connection. The data is stored on the server 83 and can be accessed through the dashboard application 80 via the Internet. The data is identified and organized on the server 83 by the serial number of locking device 10 and the phone number of the mobile device 60, which are sent from the mobile device 60 to the server 83 along with the collected data. The serial number of locking device 10 must be registered on the vehicle owner's account for the collected data to become available on the dashboard 80.

The data being collected and stored may include vehicle location and speed, which could permit route monitoring and mapping by the vehicle owner on the dashboard 80. Additional collected data may include all incoming or outgoing calls and/or text messages that were attempted from the mobile device 60 while in the "locked condition," and may also include the time or weather condition of any calls. Phone numbers of the person calling or being called could be blocked and not shown on the dashboard. Additional data that may be collected and made available on the dashboard 80 includes, but is not limited to, average vehicle speed for a trip, number of calls made to safety numbers, attempts made by the user to unlock the mobile device 60, instances of hard braking or acceleration, instances of hard or aggressive turning, wipers on or off when raining, lights on or off, tire pressure warnings, number of emergency events such as accidents. Much of this data will be available only from the vehicle through a suitable communication link between the mobile device 60 and the vehicle.

On mobile devices 60 running iOS, data concerning the receipt of a phone call or a text message when mobile device 60 is in a "locked condition" is not made available to the locking application 50. In these situations, locking device 10 emulates the functionality of a Bluetooth headset. When a call or text message is received by mobile device 60 while in a locked condition, this data is passed along to the emulated Bluetooth headset and is in turn sent by locking device 10 to locking application 50 for recordal and sending to the server 83. This data may be used by the server 83 to alert the caller or the sender of the text message that the owner of the mobile device 60 is currently driving a motor vehicle and is therefore unavailable to take a call or read the text message. On mobile devices 60 running other operating systems, this type of data is available to locking application 50 without the need to employ an emulated Bluetooth headset device.

The mobile device locking software on locking device 10 may include functionally to permit the user to set a maximum allowable speed for the vehicle and to send a notification to the mobile device 60 and/or to the dashboard 80 when the vehicle exceeds that speed.

The dashboard application 80 may also be used to ping the locking device 10 to obtain a GPS location of the locking device 10. The dashboard 80 could also include functionality to permit a user to set geofencing options for the locking device 10 and be notified when the locking device 10 enters or leaves a geofence zone. A timer may be included to indicate and record how long the vehicle has been idling to assist a user in saving on fuel by reducing the vehicle's idle time.

Some or all of the above-mentioned data collected by locking application 50 and transmitted to the server 83 could be used to determine whether the vehicle driver has achieved certain predetermined safety standard during a trip. This could be used to operate a rewards program, whereby drivers collect safety points that may be redeemed for valuable merchandise or cash.

In another embodiment, the mobile device locking software that is described herein as being installed on the integrated circuits 30 of locking device 10 could instead be installed on a navigation system or other computer system of the motor vehicle, including the ignition key. In this embodiment, the mobile device locking software would include the same above-described functionality for sending locking signals 70, using Bluetooth or other communication systems installed on the motor vehicle, to the mobile device 60 to cause the locking application 50 to lock and mute the mobile device 60 when the vehicle ignition is turned on. In this embodiment, the connection between the locking application 50 on mobile device 60 and the mobile device locking software installed on the navigation system or other computer system of the motor vehicle, including the ignition key, could be made through any suitable vehicle communication link between the mobile device 60 and the vehicle such as the above-mentioned SmartDeviceLink.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

The use of the terms "a" and "an" and "the" and similar referents in this specification are to be construed to cover both the singular and the plural, unless otherwise indicated or clearly implied by the context. The terms "comprising", "having" and "including" are to be construed as open-ended terms (i.e. meaning "including, but not limited to,") unless otherwise noted.

This invention has been described in terms of specific embodiments, implementations and configurations which are intended to be examples only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. An apparatus for preventing use of a mobile device while operating a motor vehicle comprising:
    a locking device having a housing for connection to the motor vehicle;
    a locking device processor and memory contained within the housing for storing and executing mobile device locking software;
    locking device communication circuits contained within the housing and connected to the processor for establishing a connection between the locking device and the mobile device and for sending locking signals to the mobile device when power to the vehicle is turned on; and a mobile device locking application installed on the mobile device for placing the mobile device into a locked condition when the locking signals are received by the mobile device, thereby preventing use of the mobile device, and wherein the mobile device locking application includes functionality to measure a relative signal strength indicator (RSSI) of the locking signals received from the locking device and to communicate the RSSI to a remote dashboard application, wherein the remote dashboard application includes functionality to compare the RSSI with at least one additional RSSI received from at least one additional mobile device locking application running on at least one additional mobile device connected to the locking device, and wherein the dashboard application includes functionality to send an unlock signal to the mobile device locking application running on the mobile devices other than the mobile device having the highest RSSI.

2. The apparatus of claim 1, wherein the locking signals include a serial number of the locking device and a system-specific prefix code, wherein the locking signals cause the mobile device locking application to place the mobile device into the locked condition.

3. The apparatus of claim 1, wherein the mobile device locking application displays a lock screen on the mobile device upon receipt of the locking signals.

4. The apparatus of claim 1, wherein the mobile device locking application includes functionality to unlock the mobile device once the locking device is determined as no longer active and a speed of the mobile device is below a pre-determined minimum speed.

5. The apparatus of claim 1, wherein the mobile device locking application includes functionality to collect and store data sent from the locking device.

6. The apparatus of claim 5, wherein the data is selected from the group consisting of vehicle location, vehicle speed, average vehicle speed, attempted incoming calls, attempted outgoing calls, attempted incoming text messages, attempted outgoing text messages, time of attempted calls, time of text messages, weather condition, number of calls made to safety numbers, number of attempts made to unlock the mobile device, number of instances of hard braking, number of instances of hard acceleration, number of instances of hard turning, vehicle wipers turned on or off, vehicle lights turned on or off, vehicle tire pressure, number of accidents, and combinations of the foregoing.

7. The apparatus of claim 1, wherein the establishing a connection between the locking device and the mobile device is accomplished automatically.

8. The apparatus of claim 1, wherein the establishing a connection between the locking device and the mobile device is accomplished by a pairing operation between the locking device and the mobile device.

9. The apparatus of claim 8, wherein the locking device includes functionality to emulate a Bluetooth peripheral keyboard for the sending of the locking signals to the mobile device.

10. The apparatus of claim 1, wherein the mobile device locking application includes functionality to display an alert on the mobile device when the communication functionality of the mobile device is turned off.

11. The apparatus of claim 1, wherein the mobile device locking application includes functionality to send a message to an owner of the motor vehicle when the communication functionality of the mobile device is turned off.

12. The apparatus of claim 1, wherein the locking device includes functionality for restarting of the mobile device locking application by sending a mobile device locking application re-start signal to the mobile device to tell the mobile device locking application to re-start in response to receiving a re-start signal from the mobile device locking application when indicating that the mobile device locking application stops stopped running on the mobile device.

13. The apparatus of claim 12, wherein the mobile device locking application includes functionality to send the re-start signal from the mobile device to the locking device when the mobile device locking application stops running on the mobile device, the re-start signal telling the locking device to commence the restarting of the mobile device locking application.

14. The apparatus of claim 1, wherein the mobile device locking application includes functionality to send an alert to a caller or a sender of a text message to the mobile device when the mobile device is in the locked condition.

15. A method for preventing use of a mobile device while operating a motor vehicle, the method comprising:

installing a locking application on a memory of the mobile device, the locking application comprising mobile device locking instructions for execution by a processor of the mobile device upon receipt of a lock signal by the mobile device;

connecting a locking device to the power supply of the motor vehicle;

establishing a connection between the locking device and the mobile device; and sending the lock signal from the locking device to the mobile device when the vehicle power is turned on, the lock signal causing the mobile device processor to execute the mobile device locking instructions configuring the mobile device to enter into a locked condition, thereby preventing use of the mobile device;

measuring a relative signal strength indicator (RSSI) of the locking signals received from the locking device; and communicating the RSSI to a remote dashboard application, wherein the remote dashboard application compares the RSSI with at least one additional RSSI received from at least one additional locking application running on at least one additional mobile device connected to the locking device, and wherein the dashboard application sends an unlock signal to the locking application running on the mobile devices other than the mobile device having the highest RSSI.

16. An apparatus for preventing use of a mobile device while operating a motor vehicle comprising:

a locking device having a housing for connection to the motor vehicle;

a locking device processor and memory contained within the housing for storing and executing mobile device locking software;

locking device communication circuits contained within the housing and connected to the processor for establishing a connection between the locking device and the mobile device and for sending locking signals to the mobile device when power to the vehicle is turned on; and a mobile device locking application installed on the mobile device for placing the mobile device into a locked condition when the locking signals are received by the mobile device, thereby preventing use of the mobile device, wherein the locking device includes functionality for restarting the mobile device locking application by sending a mobile device locking application re-start signal to the mobile device to tell the mobile device locking application to re-start in response to receiving a re-start signal from the mobile device locking application when the mobile device locking application stops stopped running on the mobile device.

17. The apparatus of claim 16, wherein the locking signals include a serial number of the locking device and a system-specific prefix code, wherein the locking signals cause the mobile device locking application to place the mobile device into the locked condition.

18. The apparatus of claim 16, wherein the mobile device locking application displays a lock screen on the mobile device upon receipt of the locking signals.

19. The apparatus of claim 16, wherein the mobile device locking application includes functionality to measure a relative signal strength indicator (RSSI) of the locking signals received from the locking device and to communicate the RSSI to a remote dashboard application, wherein the remote dashboard application includes functionality to compare the RSSI with at least one additional RSSI received from at least one additional mobile device locking application running on at least one additional mobile device connected to the locking device, and wherein the dashboard application includes functionality to send an unlock signal to the mobile device locking application running on the mobile devices other than the mobile device having the highest RSSI.

20. The apparatus of claim 16, wherein the mobile device locking application includes functionality to unlock the mobile device once the locking device is determined to be no longer active and a speed of the mobile device is below a pre-determined minimum speed.

21. The apparatus of claim 16, wherein the mobile device locking application includes functionality to send a message to an owner of the motor vehicle when communication functionality of the mobile device is turned off.

\* \* \* \* \*